United States Patent [19]

Yang et al.

[11] Patent Number: 5,366,379

[45] Date of Patent: Nov. 22, 1994

[54] NEEDLE-PUNCTURING POSITION INDICATING APPARATUS UTILIZING A LIGHTING DISPLAY PANEL IN FINGERS ACUPUNCTURE

[76] Inventors: Hong-Mo Yang, Banpo Apartment 105-505, 955, Banpo-dong, Seocho-ku, Seoul; Chang-Gyu Kim, 1130-18, Hwagok-bondong, Kangseo-ku, Seoul, both of Rep. of Korea

[21] Appl. No.: 792,494

[22] Filed: Nov. 12, 1991

[30] Foreign Application Priority Data

Aug. 5, 1991 [KR] Rep. of Korea ............... 12458/1991

[51] Int. Cl.⁵ .............................................. G09B 25/00
[52] U.S. Cl. .................................... 434/365; 434/257; 128/735; 128/907; 606/204; 607/88; 601/134; 364/413.01
[58] Field of Search ............... 434/247, 257, 365, 307; 128/419 R, 735, 60, 907, 783; 606/204; 364/413.01; 607/2, 3, 46, 59, 88; 601/134

[56] References Cited

U.S. PATENT DOCUMENTS

| | | | |
|---|---|---|---|
| 4,073,296 | 7/1983 | McCall | 128/60 X |
| 4,895,149 | 1/1990 | Morez | 128/419 R |
| 5,144,554 | 9/1992 | Zhang et al. | 128/907 X |
| 5,195,517 | 3/1993 | Chen | 128/907 X |

FOREIGN PATENT DOCUMENTS 2713019  10/1978  Germany ........................... 128/735

*Primary Examiner*—Richard J. Apley
*Assistant Examiner*—Joe Cheng
*Attorney, Agent, or Firm*—Skjerven, Morrill, MacPherson, Franklin & Friel

[57] ABSTRACT

This invention relates to a finger acupuncture needle puncturing position indicating apparatus in which a code reference book of symptoms (103) describing in detail symptoms of affected regions of a human body is attached to a side of the interior surface of a cover (503) on which human body anatomical charts (101) showing proper code numbers for each region are also mounted; underneath the book is a needle box (403) with a door (402) capable of storing a number of needles (401); displayed on a lighted display panel (102) mounted on the body (502) of a case are the palm and back of a hand indicating needle-puncturing positions; and mounted on one side of the body (502) of the case are a keyboard (201) with a number of keys for inputting code numbers from the human body anatomical charts (101) and the code reference book of symptoms (103) as well as a display button (202) for outputting these codes.

4 Claims, 2 Drawing Sheets

NEEDLE-PUNCTURING POSITION INDICATING APPARATUS UTILIZING A LIGHTING DISPLAY PANEL IN FINGERS ACUPUNCTURE

FIELD OF THE INVENTION

The present invention relates to a needle-puncturing position indicating apparatus utilizing a lighted display panel in finger acupuncture. According to the invention, using either human body anatomical charts or a code reference book of symptoms, a code corresponding to the sore-affected portion of the body is identified. After this code is entered using a keyboard, a display button is pressed. As this invention enables needle-puncturing positions corresponding to respective organs of the human body to be displayed on a lighted panel, the correct needle puncturing positions associated with various kinds of symptoms are accurately identified and confirmed before finger acupuncture is actually performed.

BACKGROUND OF THE INVENTION

In the past, complete, accurate information on needle puncturing positions in finger acupuncture required referencing a number of professional books and drawings. However, the acquisition and maintenance of these books has been difficult. Further, due to difficulties in obtaining technical information, students eager to master finger acupuncture had to waste a great deal of effort and time in learning the respective local points of fingers and the exact puncturing positions of needles associated with various symptoms. As a result of both this difficulty and the perception that learning finger acupuncture is extremely difficult, a general beginner may have reluctant to acquire knowledge and skill in this field. Therefore, treatment of diseases through finger acupuncture technique has been avoided.

Further, patients who are afraid of being infected through a wounded region of skin with hepatitis, AIDS or some other life-threatening disease tend to refuse treatment at general hospitals or acupuncture clinics.

SUMMARY OF THE INVENTION

Accordingly, the object of the present invention is to solve these conventional problems. Using technical information on accurate puncturing positions in finger acupuncture, the invention displays on a lighted display panel points on the palm and back of a hand corresponding to respective regions of a human body. This enables a person to use finger acupuncture technique simply and easily.

Figure 1:
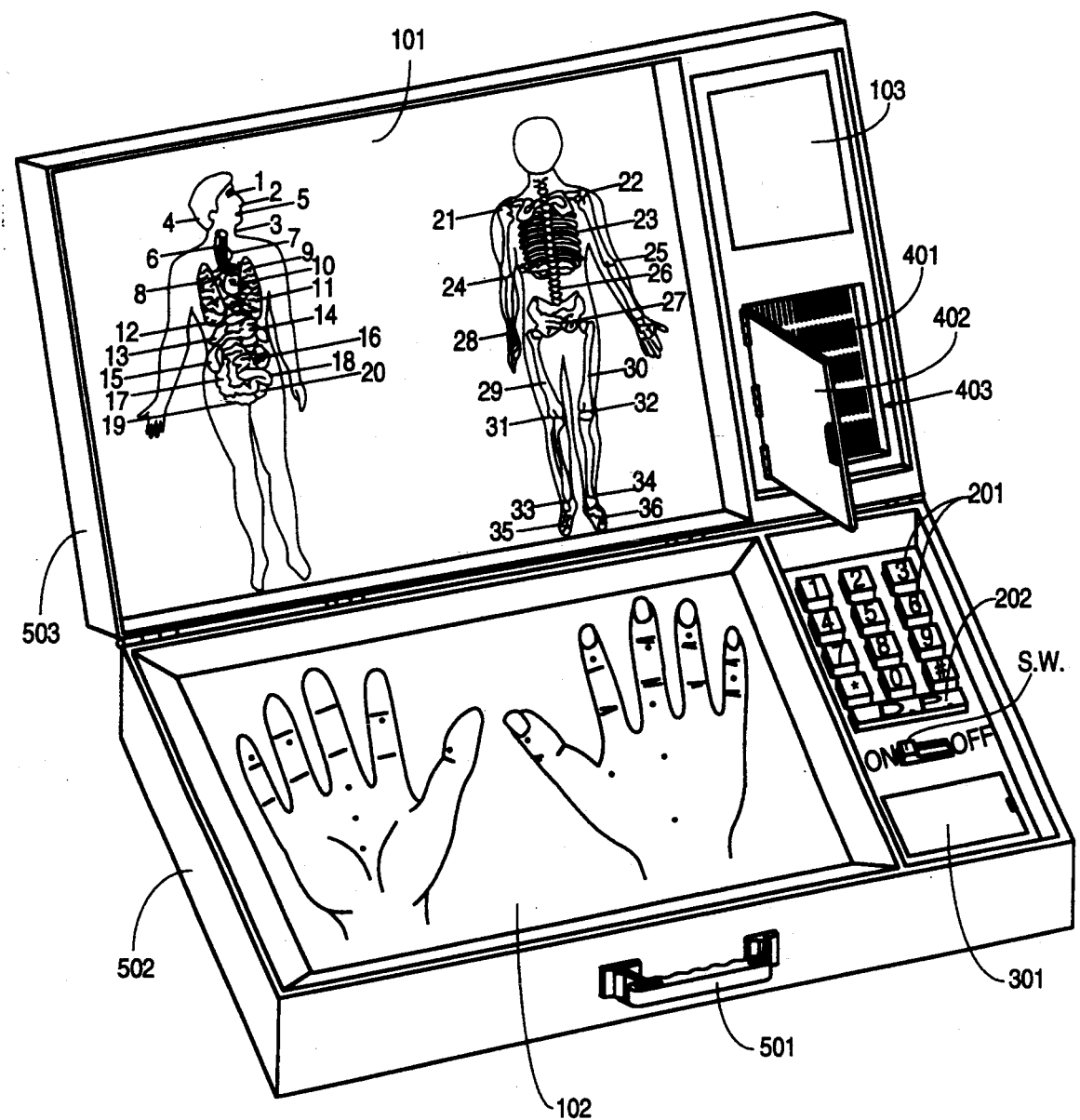
FIG. 1 is a perspective view of the entire body of the present invention.
Figure 2:
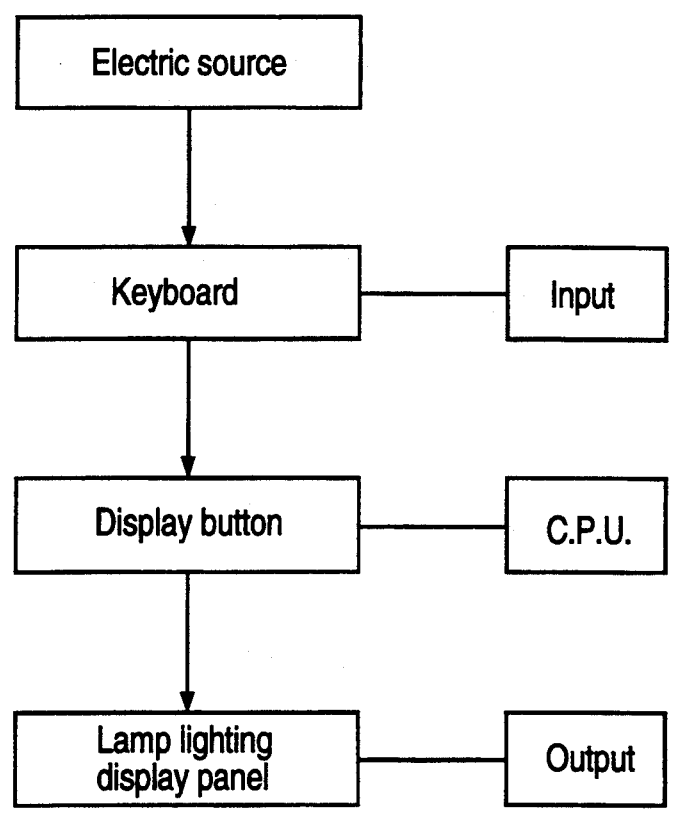
FIG. 2 is a flow chart depicting how this invention works.

Reference numbers specifying some main portions of FIG. 1 are as follows:

- 101 . . . Anatomical charts
- 102 . . . Lighting display chart
- 103 . . . Booklet listing symptoms
- 201 . . . Keyboard
- 202 . . . Display button
- 401 . . . Fingers acupuncture needles
- 502 . . . Body of a case

DETAILED DESCRIPTION OF THE INVENTION

A preferred embodiment of the present invention is described in detail with reference to the accompanying figures.

FIG. 1 is a pictorial view of one embodiment of the present invention. The closable case includes a base (502) and a cover (503). A code reference book (103) listing symptoms of affected regions of the human body is attached to the upper right corner of the interior surface of the cover (503). Attached below the code reference book (103) is a needle box (403) with a door (402) capable storing a number of needles (401). Front and rear views of anatomical charts (101) of the human body with proper code numbers are mounted on the left portion of the cover (503). A lighted display panel (102) showing the palm and back of a hand is mounted on the body (502) of the case. Installed on the right side of the body (502) of the case is a keyboard (201) consisting of a number of keys for inputting the code numbers from the human body anatomical charts (101) and the code reference book of symptoms (103), a display button (202) for outputting these codes, a battery storage space (301) containing a power supply battery, and a power supply switch (SW). A hand grip (501) is attached to the end of the body (502).

The present invention enables practicing of finger acupuncture by displaying the needle-puncturing position on a display panel. First, the power supply switch (SW) is turned on and power is supplied. Then, the code numbers are confirmed from the anatomical charts (101) and the code reference book of symptoms. After these code numbers are input using the keyboard, (201) the display button (202) is pressed. Since a predetermined current is output through a central processing unit which operates and controls a signal current input through the keyboard (201), puncturing positions of the finger acupuncture needles are selectively displayed on predetermined regions of the palm and back of a hand on the lighted display panel (102). These regions correspond to the code numbers obtained from the human body anatomical charts (101) and the code reference book of symptoms (103). Accordingly, needle puncturing positions corresponding to various symptoms are accurately provided on the lighted display panel (102), thus facilitating treatment with finger acupuncture.

A few actual examples of the invention are illustrated below:

EXAMPLE 1

When the code corresponding to the stomach of a human body is desired, a code number 10 referring to the stomach is confirmed. After turning the power supply switch (SW) on, the code number 10 (corresponding to the stomach) is input using the keyboard (201) and display button (202) is pressed. Since the needle puncturing region corresponding to code number 10 is displayed as a point at a predetermined region of the palm and back of a hand on the lighted display panel (102), finger acupuncture treatment for stomach ailments corresponding to code number 10 can then be accurately applied by using the acupuncture needles (401).

EXAMPLE 2

Confirmation of code numbers associated with the symptoms for indigestion is not possible using the anatomical charts (101). Rather, confirmation of these code numbers can only be accomplished by using the code reference book of symptoms (103). After turning the power supply switch (SW) on, a code number associated with an indigestion symptom is input using the keyboard (201). Then, the display button (202) is pressed. Since the puncturing position of a needle (401) corresponding to an indigestion symptom is correctly displayed as a point at a predetermined region of the palm and back of a hand on the lighted display panel (102), finger acupuncture treatment utilizing needles (401) can be simply and easily accomplished.

In accordance with the present invention, a lighted display panel (102) showing the palm and back of a hand is mounted on the main body (502) of a case which can be freely opened and closed with a cover (503). A code number is selectively identified from human body anatomical charts (101) and a code reference book of symptoms (103). This code number is then input by pressing the corresponding keys (201). Then, a puncturing region corresponding to a particular symptom and its associated code number is displayed at a predetermined region of the palm and back of a hand on the lighted display panel (102). The lighted display panel (102) showing the palm and back of a hand may utilize a normal liquid crystal board (L.C.D.), a light emitting diode (L.E.D.), a fluorescent panel, or the like. In some embodiments, the needle-puncturing positions, which correspond to code numbers for symptoms, and the drawings of the palm and back of a hand are stored in memory. Also, in some embodiments the present invention may be equipped with a central processing unit (CPU) to enable the needle puncturing positions to be displayed on a monitor or television.

Since the human body anatomical charts (101) and the code reference book of symptoms (103) are contained in one embodiment of the present invention, one can identify the code number of the region of the human body corresponding to one's symptoms, press the appropriate keys (201), and then press the display button (202). Since a puncturing position of a needle is accurately and instantaneously displayed at a predetermined, corresponding region of the palm and back of a hand on the lighted display panel (102), acupuncture treatment can be simply and easily performed by using finger acupuncture needles (401) stored in the needle storage box (403). The architecture of the present invention is very simple and its operating procedure is convenient and easy. Even a beginner who is not knowledgeable in finger acupuncture technique can use this invention. The invention is believed to be novel, useful, and practical.

It is to be understood that the present invention is not restricted to the particular embodiment that has been described above, and that variations and modifications may be made therein without departing from the scope of the invention as defined in the appended claims.

What is claimed is:

1. A portable apparatus for utilizing needle-puncturing positions of acupuncture on a palm and a back of a hand, said apparatus comprises:
    a portable case having a cover portion hinged to a body portion;
    human body anatomical charts attached to a first section of a interior surface of said cover portion for showing proper code numbers for organs of a human body;
    a code reference symptoms book describing symptoms of affected regions with the corresponding symptom reference codes, said symptoms book attached to a second section of said interior surface of said cover portion and adjacent to said human body anatomical charts;
    a display panel means mounted on a first section of said body portion for displaying the puncturing positions of acupuncture on a palm and a back of a hand;
    a keyboard means mounted on a second section of said body portion and adjacent to said display panel means, said keyboard means having a plurality of input keys for inputting a symptom reference code identified by said human body anatomical charts and a power supply switch; and
    control means coupled to said keyboard means and said display panel means for controlling said display panel means to display the puncturing positions of acupuncture on a palm and a back of a hand corresponding to said inputted symptom reference code.

2. The apparatus of claim 1, wherein said portable case further comprises a handle for enhancing transport.

3. The apparatus of claim 1 further comprising a needle box mounted on a third section of said interior surface of said cover portion and adjacent to said symptoms book and said human body anatomical charts, wherein a plurality of needles is stored in said needle box for performing acupuncture on a palm and a back of a hand.

4. The apparatus of claim 1 further comprising a power storage means mounted on a third section of said body portion and adjacent to said keyboard and said display panel means for storing a power supply battery.

* * * * *